(12) United States Patent
Feinberg

(10) Patent No.: US 6,965,298 B2
(45) Date of Patent: Nov. 15, 2005

(54) METHOD AND APPARATUS FOR FACILITATING COMMUNICATION BETWEEN A USER AND A TOY

(75) Inventor: Paul H. Feinberg, River Vale, NJ (US)

(73) Assignees: Sony Corporation, (JP); Sony Electronics, Inc., Park Ridge, NJ (US)

( * ) Notice: Subject to any disclaimer, the term of this patent is extended or adjusted under 35 U.S.C. 154(b) by 507 days.

(21) Appl. No.: 09/803,250

(22) Filed: Mar. 9, 2001

(65) Prior Publication Data

US 2002/0125996 A1      Sep. 12, 2002

(51) Int. Cl.[7] ............................................. H04Q 5/22
(52) U.S. Cl. ................ 340/10.41; 340/10.1; 340/10.4; 340/825.72; 340/539.1; 340/5.3; 340/825.69; 340/10.51; 340/10.5; 446/175; 446/268; 446/297
(58) Field of Search ..................... 340/10.41, 573.1, 340/539.1, 5.3; 446/456, 175, 268, 297

(56) References Cited

U.S. PATENT DOCUMENTS

| | | | |
|---|---|---|---|
| 5,314,336 A * | 5/1994 | Diamond et al. ............ 434/169 |
| 5,661,470 A | 8/1997 | Karr ....................... 340/825.54 |
| 5,689,238 A | 11/1997 | Cannon, Jr. et al. ......... 340/568 |
| 5,883,576 A | 3/1999 | De La Huerga .......... 340/573.1 |
| 5,883,592 A | 3/1999 | Schepps et al. ................ 342/44 |
| 5,889,489 A | 3/1999 | Friedman et al. .............. 342/51 |
| 5,912,632 A | 6/1999 | Dieska et al. ........... 340/825.54 |
| 6,049,292 A | 4/2000 | Einfeldt et al. ......... 340/825.54 |
| 6,057,756 A | 5/2000 | Engellenner ................. 340/505 |
| 6,084,530 A | 7/2000 | Pidwerbetsky et al. 340/825.54 |
| 6,104,295 A | 8/2000 | Gaisser et al. ............ 340/573.4 |
| 6,104,311 A * | 8/2000 | Lastinger ................ 340/825.54 |
| 6,171,168 B1 * | 1/2001 | Jessop ......................... 446/297 |
| 6,290,566 B1 * | 9/2001 | Gabai et al. ................. 446/175 |
| 6,361,396 B1 * | 3/2002 | Snyder et al. ............... 446/397 |
| 6,364,735 B1 * | 4/2002 | Bristow et al. .............. 446/397 |
| 6,380,844 B2 * | 4/2002 | Pelekis ........................ 340/5.8 |

OTHER PUBLICATIONS

Microsoft.com/products/hardware/actimates website, (2 pages), last refreshed May 17, 1999.

* cited by examiner

Primary Examiner—Brian Zimmerman
Assistant Examiner—Vernal Brown
(74) Attorney, Agent, or Firm—Lerner, David, Littenberg, Krumholz & Mentlik, LLP

(57) ABSTRACT

An apparatus includes a plurality of radio frequency tags operable to produce respective answer electromagnetic waves in response to a query electromagnetic wave; and a toy including a query circuit and an interaction circuit, the query circuit being operable to emit the query electromagnetic wave and receive one or more of the answer electromagnetic waves, and the interaction circuit being operable to select an output perceptible by a user based on which of the one or more answer electromagnetic waves are received.

44 Claims, 5 Drawing Sheets

METHOD AND APPARATUS FOR FACILITATING COMMUNICATION BETWEEN A USER AND A TOY

BACKGROUND OF THE INVENTION

The present invention relates to methods and apparatuses for facilitating communication between a user and a toy and, more particularly, to the use of radio frequency tags in facilitating such communication.

With reference to FIG. 1, a convention apparatus 10 is shown which facilitates communication between a base 12 and a toy 14 to facilitate a semi-interactive play experience for a child (not shown). The base 12 includes a microprocessor 16, an audio circuit 18 and a query circuit 20. The toy 14 includes a responder 22. In operation, the query circuit 20 outputs a pulse signal, usually in the radio frequency spectrum, that is received by the responder 22 of the toy 14. The responder 22 produces a response signal, also in the radio frequency spectrum, in response to the pulse signal from the query circuit 20 of the base 12. The query circuit 20 is further operable to detect the response signal from the responder 22 and to provide an indication to the microprocessor 16 of the proximity of the toy 14. When the microprocessor 16 receives an indication of the proximity of the toy 14, it commands the audio circuit 18 to produce an audible signal directed to the child.

Unfortunately, the conventional method and apparatus suffers from a number of disadvantages, e.g., the audible signals issued from the audio circuit 18 of the base 12 bear no relationship to the relative positions of the child and the toy 14. Rather, the audible signals from the base 12 are a function of the relative positions of between the toy 14 and the base 12. This severely limits the scope of interactive play between the child and the toy 14. Further, there is no relationship between the audio signal from the base 12 and the surroundings in which the base 12, the toy 14, and the child are located. Indeed, the only variable that affects the audible signal issued by the audio circuit 18 is the proximity and/or orientation of the toy 14 with respect to the base 12.

Accordingly, it would be desirable to employ new methods and/or apparatuses for facilitating communication between a user, for example a child, and a toy which take into account the proximity of the user to the toy and/or the surroundings in which the user and toy are located, thereby greatly expanding the range of interactive play enjoyed by the user.

SUMMARY OF THE INVENTION

In accordance with at least one aspect of the present invention, an apparatus includes: at least one mobile item operable to be carried by a user and including a radio frequency tag operable to produce an answer electromagnetic wave in response to a query electromagnetic wave; and a toy including a query circuit and an interaction circuit, the query circuit being operable to emit the query electromagnetic wave and receive the answer electromagnetic wave, and the interaction circuit being operable to select an output perceptible by the user based on the answer electromagnetic wave.

In accordance with at least one further aspect of the present invention, an apparatus includes: a plurality of radio frequency tags operable to a query electromagnetic wave; and a toy including a query circuit and an interaction circuit, the query circuit being operable to emit the query electromagnetic wave and receive one or more of the answer electromagnetic waves, and the interaction circuit being operable to select an output perceptible by a user based on which of the one or more answer electromagnetic waves are received.

In accordance with at least one still further aspect of the present invention, a method includes: providing at least one mobile item operable to be carried by a user and emit an answer electromagnetic wave in response to receiving a query electromagnetic wave; providing a toy operable to emit the query electromagnetic wave and receive the answer electromagnetic wave; and selecting an output to issue from the toy that is perceptible by the user based on the answer electromagnetic wave.

Other features, aspects, advantages and the like with become apparent to one skilled in the art when the disclosure herein is taken in conjunction with the accompanying drawings.

BRIEF DESCRIPTION OF THE DRAWINGS

For the purposes of illustrating the invention, there are shown in the drawings forms which are presently preferred, it being understood, however, that the invention is not limited to the precise arrangements and instrumentalities shown.

DETAILED DESCRIPTION

Figure 1:
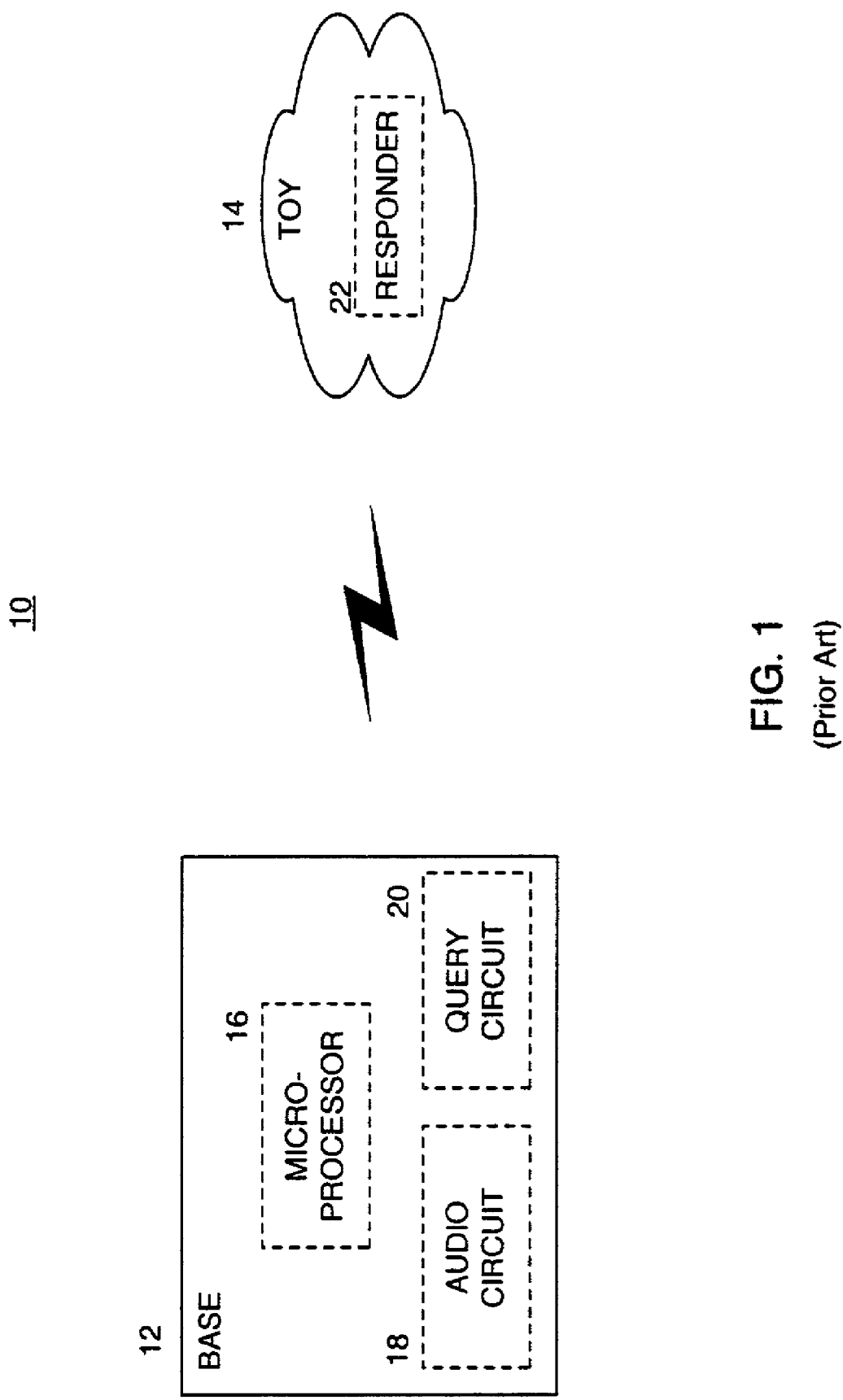
FIG. 1 is a block diagram illustrating a conventional apparatus for facilitating communication between a base and a toy in accordance with the prior art.
Figure 2:
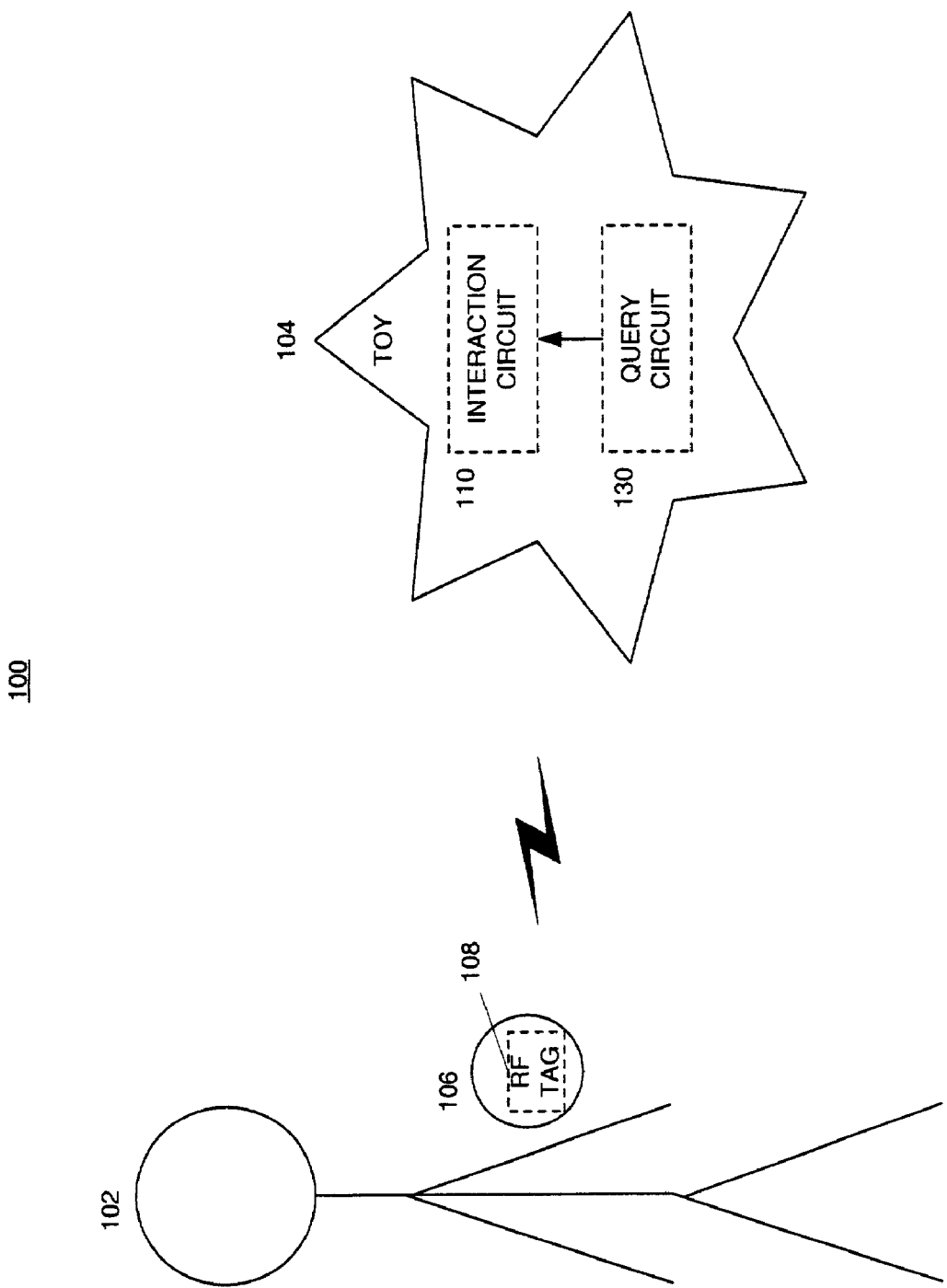
FIG. 2 is a block diagram illustrating a method and/or apparatus for facilitating communication between a user and a toy in accordance with at least one aspect of the present invention.

FIG. 2 is a block diagram of an apparatus 100 suitable for facilitating communication between a user 102, such as a child, and a toy 104 in accordance with one or more aspects of the present invention. The apparatus 100 preferably includes at least one mobile item 106 having an RF tag 108, and the toy 104, which includes an interaction circuit 110 and a query circuit 130. The one or more mobile items 106 may take on any suitable form, where a piece of apparel is most preferred, such as a ring, a bracelet, a necklace, a glove, a belt, a hat, a pair of glasses, etc.

The one or more mobile items 106 are preferably operable to be carried by the user 102 and the RF tag 108 is preferably operable to produce an "answer" electromagnetic wave in response to receiving a "query" electromagnetic wave from the query circuit 130 of the toy 104. The RF tag 108 may be implemented utilizing any of the known technologies, such as the use of a RF transponder having an antenna, rectification power supply, logic/memory, a receiver, and an oscillator. Additional details concerning this type of RF tag 108 may be found in U.S. Pat. No. 5,912,632, entitled SINGLE CHIP RF TAG OSCILLATOR CIRCUIT SYNCHRONIZED BY BASE STATION MODULATION FREQUENCY, the entire disclosure of which is hereby incorporated by reference. Alternatively, the RF tag 108 may be implemented utilizing resonant LC circuitry, which is significantly less complex. Additional details concerning the use of resonant RF tags may be found in U.S. Pat. No. 5,661,470, entitled OBJECT RECOGNITION SYSTEM, the entire disclosure of which is hereby incorporated by reference.

The query circuit 130 is preferably operative to produce the query electromagnetic wave either periodically or otherwise such that when the mobile item 106 comes within sufficient proximity to the toy 104, the query circuit 130 is operable to receive the answer electromagnetic wave issued from the RF tag 108. The interaction circuit 110 is preferably operable to select and issue an output that is perceptible by the user 102 and that is based on the answer electromagnetic wave. By way of example, the toy 104 may be a stuffed animal, e.g., a teddy bear, and the interaction circuit 110 may be operable to issue an audible output based on an answer electromagnetic wave issued by the RF tag 108. When the user 102, carrying the mobile item 106, comes sufficiently close to the toy 104, for example, when the user 102 enters a room in which the toy 104 is located, the query circuit 130 may issue a query electromagnetic wave causing the RF tag 108 to issue an answer electromagnetic wave. The query circuit 130 may then provide an indication to the interaction circuit 110 that an answer electromagnetic wave was received. In response, the interaction circuit 110 may issue an appropriate audible output, for example, "Teddy would love a hug." As the interaction circuit 110 would not issue the audible output until the user 102, carrying the mobile item 106, came within proximity to the toy 104, it would appear that the toy 104 issued the audible output in response to the user 102 himself. Advantageously, this yields enjoyable interactive play between the user 102 and the toy 104.

Figure 3:
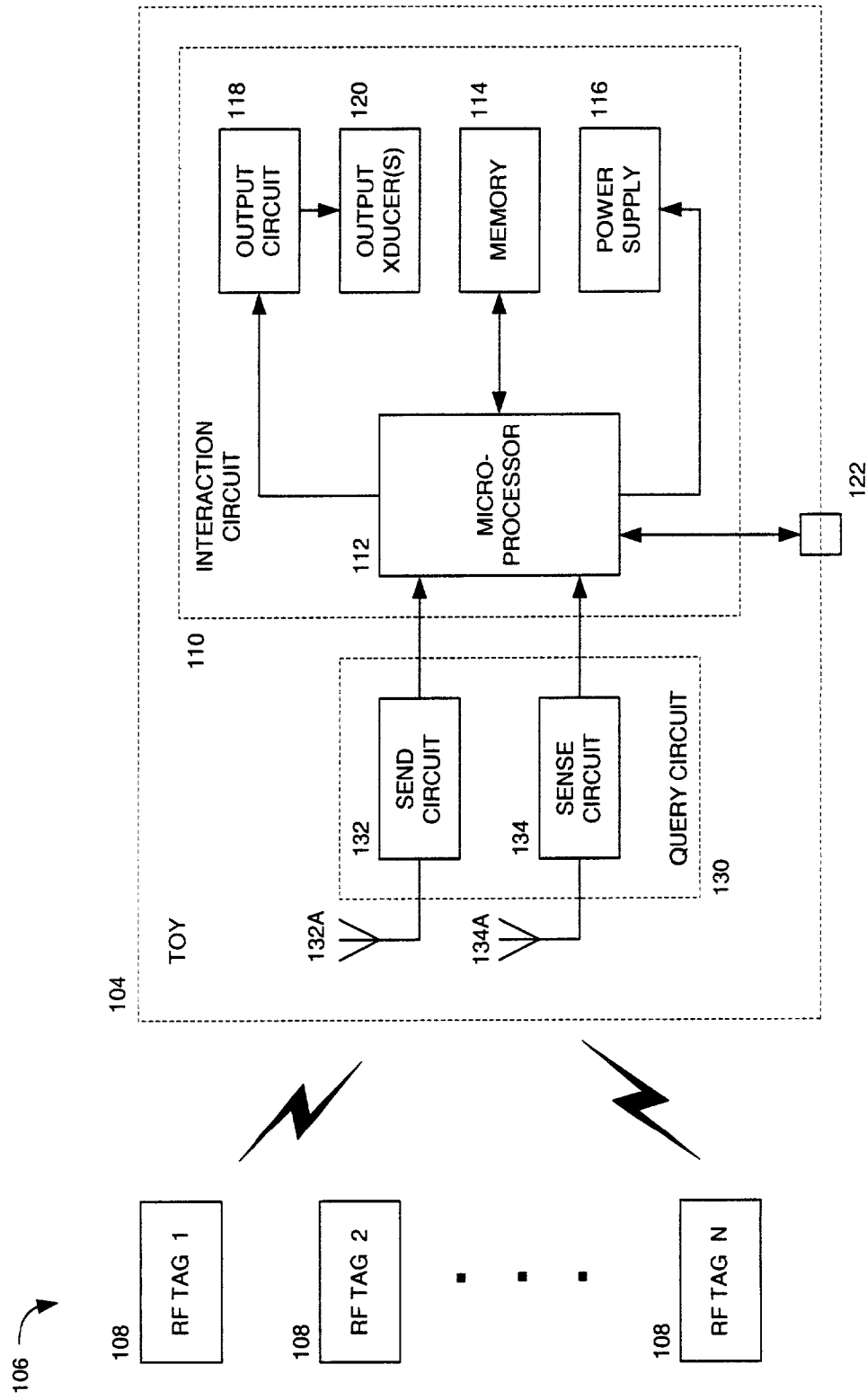
FIG. 3 is a block diagram illustrating an example of circuitry which may be employed to facilitate the communication between the user and the toy in accordance with one or more aspects of the present invention.

With reference to FIG. 3, additional details concerning the query circuit 130 and interaction circuit 110 will now be described. The query circuit 130 preferably includes a send circuit 132 operable to produce the query electromagnetic wave, and a sense circuit 134 operable to receive the answer electromagnetic wave. Any of the known circuit topologies and/or techniques may be employed in implementing the send circuit 132 and the sense circuit 134. As illustrated, the send circuit 132 and the sense circuit 134 includes an antenna 132A, 134A, respectively, it being understood that a single antenna may be employed when suitable circuit techniques are used.

The interaction circuit 110 preferably includes a microprocessor 112 operating under the control of a suitable software program. The interaction circuit 110 also preferably includes a memory 114, a power supply 116, an output circuit 118, and one or more output transducers 120. The memory 114 is preferably operable to store the software program mentioned above and/or a plurality of selectable outputs, which will be described in more detail hereinbelow. The power supply 116 is preferably operable to supply operating voltage and current to the various circuits within the toy 104, it being most preferred that the power supply 116 is controllable by the microprocessor 112 to selectively supply the operating voltage and current to at least some of the circuits. The output circuit 118 is preferably operable to convert a signal issued by the microprocessor 112 that corresponds to the selected output into another signal suitable for driving the one or more output transducers 120. For example, the output transducers 120 may include at least one of an audio transducer (such as a speaker); a visual transducer (such as one or more lights, a video display, etc.); a tactile transducer (such as a vibrating element, a heating element, a cooling element, etc.); and a mechanical transducer (such as a motorized element or elements directed to movement of the toy 104). Depending on the type and number of output transducers 120, the output circuit 118 includes the necessary circuitry for driving such transducers 120. Any of the known circuit configurations and/or techniques may be employed in implementing the output circuit 118.

In accordance with at least one aspect of the present invention, the memory 114 preferably stores a plurality of outputs selectable by the microprocessor 112. For example, the selectable outputs may include a plurality of phrases that, when issued as audible signals from the output transducer 120 (such as a speaker), result in suitable interactive play between the user 102 and the toy 104. In accordance with at least one further aspect of the present invention, a plurality of mobile items 106 are preferably employed, where each mobile item 106 includes a separate RF tag 108, such as RF tag 1, RF tag 2, . . . RF tag N. The respective RF tags 1, 2, . . . N are preferably operable to issue differing answer electromagnetic waves that are distinguishable by the sense circuit 134 and/or the microprocessor 112. Irrespective of whether one or many mobile items 106 are employed, the microprocessor 112 is preferably operable to select one of the plurality of selectable outputs (such as a particular phrase) corresponding to the received answer electromagnetic wave. When a plurality of mobile items 106 are employed, the output issued by the output transducer 120 may be dependent on which of the one or more mobile items 106 came within proximity of the toy 104.

By way of illustration, if the memory 114 includes two selectable phrases, namely, phrase 1: "Hello mommy;" and phrase 2: "Hello daddy," the software program may be implemented such that the microprocessor 112 selects phrase 1 when the answer electromagnetic wave issued by RF tag 1 is received by the sense circuit 134 and/or selects phrase 2 when the answer electromagnetic wave issued from RF tag 2 is received by the sense circuit 134. Thus, the user 102 may select one or more of the mobile items 106 to suit his or her desires for interactive play. Alternatively, more than one user 102 may take part in the interactive play, where one of the users 102 possesses a first mobile item 106 and another user 102 possess a second mobile item 106.

In accordance with at least one further aspect of the present invention, the interaction circuit 110 is preferably operable to associate a user defined output with one or more answer electromagnetic waves such that the interaction circuit 110 is operable to select the user defined output based on receiving the associated answer electromagnetic wave. For example, the user 102 may be prompted by the interaction circuit 110 as to which of phrases 1 and 2 (i.e., a user defined phrase) should be associated with the answer electromagnetic wave issued from the first mobile item 106 and from the second mobile item 106, respectively.

Alternatively, when only one mobile item 106 is employed, the user 102 may be prompted to select which one or more stored phrases should be issued by the output transducer 120 in response to the answer electromagnetic wave received from that mobile item 106.

In accordance with at least one further aspect of the invention, the interaction circuit 110 is preferably operable to receive a user defined phrase from the user 102 and associate the user defined phrase with one or more of the answer electromagnetic waves, specified by the user 102.

For example, the microprocessor 112 may be operable to receive the user defined phrase through a port 122 (e.g., a data port) or through the output transducer 120 (e.g., a speaker operating as a microphone) and to store the user defined phrase in the memory 114 for selection when the associated answer electromagnetic wave is received. By way of illustration, the user 102 may input his or her name (i.e., a user defined phrase) into the interaction circuit 110 such that the toy 104 greets the user 102 by name.

In accordance with at least one further aspect of the present invention, the microprocessor 112 is preferably operable to turn on certain portions of the interaction circuit 110 in response to the detection of an answer electromagnetic wave. For example, the power supply 116 may supply sufficient "stand by" power for the send circuit 132 and sense circuit 134 to perform their functions from time to time, but not supply power to other portions of the interaction circuit 110, such as the memory 114, the output circuit 118, the output transducers 120, etc. When an answer electromagnetic wave is received by the sense circuit 134, however, the microprocessor 112 is preferably operable to signal the power supply 116 to provide power to the other circuits in order to facilitate issuing an output from the one or more output transducers 120 that is perceptible by the user 102. Advantageously, this can conserve power and prolong use of the toy 104.

Figure 4:
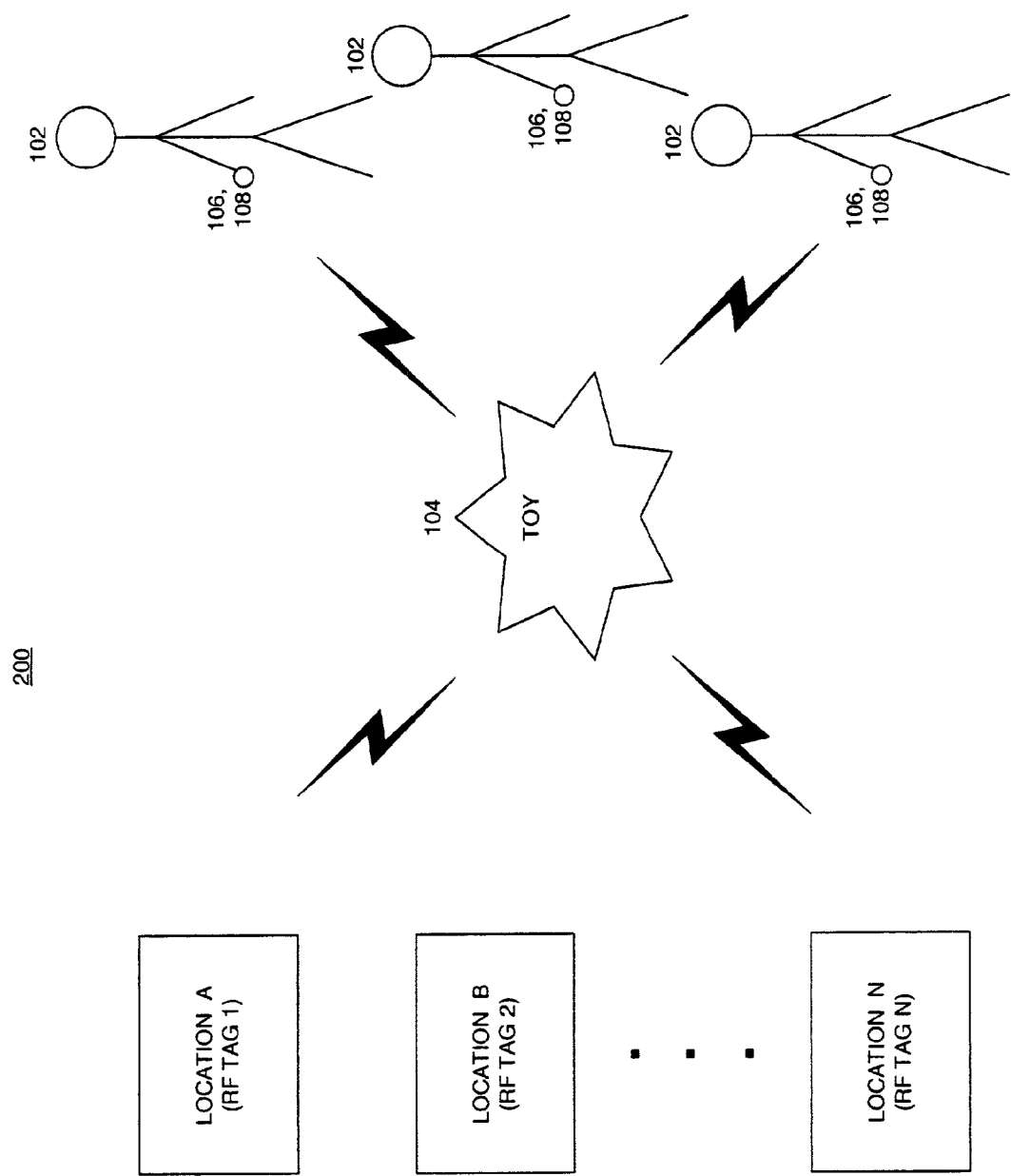
FIG. 4 is a block diagram illustrating an apparatus and/or method of facilitating communication between one or more users and a toy and/or one or more locations in which the user(s) and toy may be deposed in accordance with one or more further aspects of the present invention.

Reference is now made to FIG. 4, which is a block diagram illustrating one or more further aspects of the present invention. In particular, FIG. 4 illustrates an apparatus 200 including a plurality of RF tags 1, 2, . . . N, preferably disposed at different locations A, B, etc.; at least one toy 104, such as that shown and described hereinabove with respect to FIGS. 2 and 3; and at least one further RF tag 108 in the possession one or more users 102, preferably within one or more mobile items 106.

Figure 5:
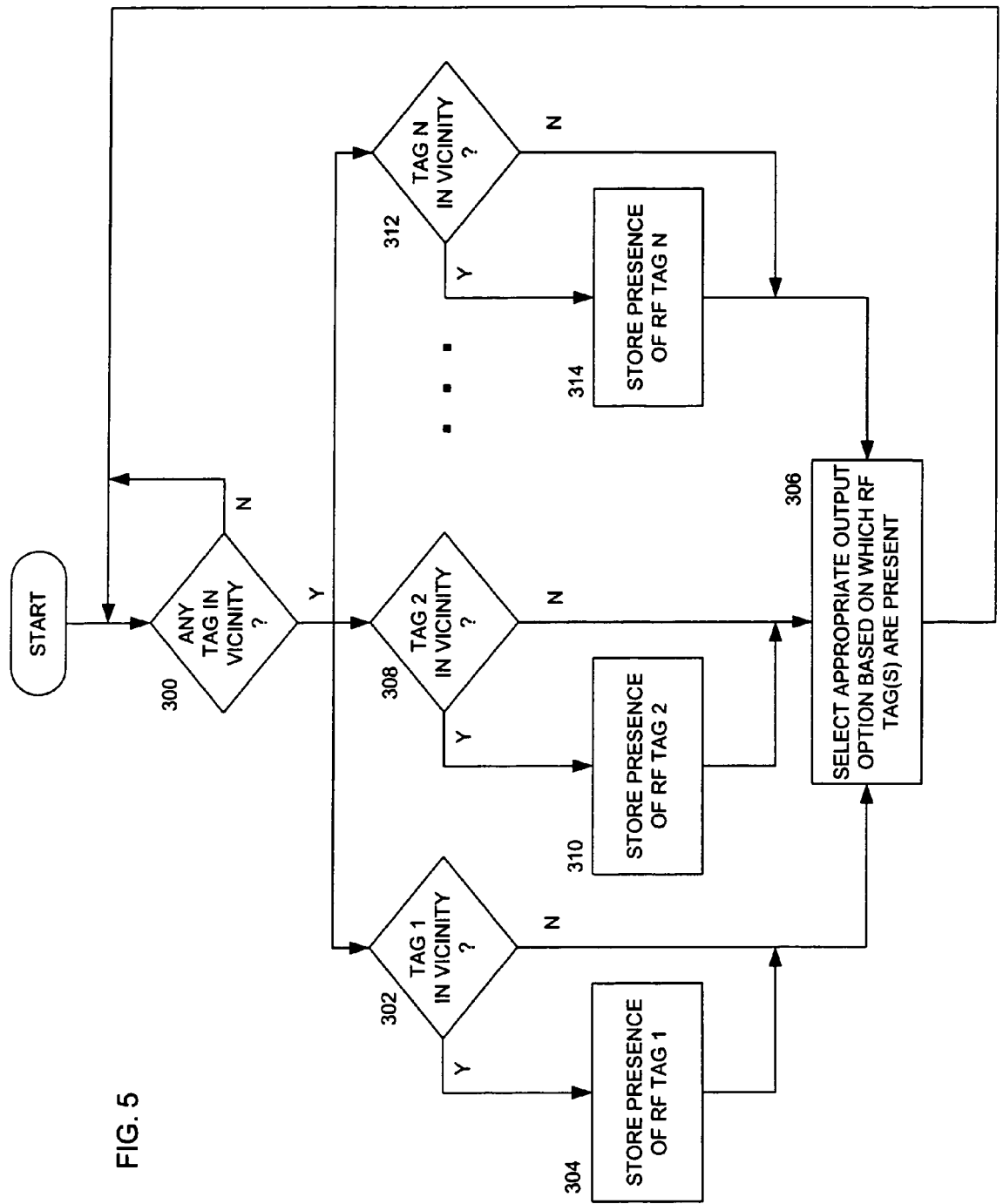
FIG. 5 is a flow diagram illustrating an example of the process steps that may be carried out in accordance with the invention shown in FIGS. 2, 3, or 4.

With reference to FIGS. 4 and 5, a flow diagram is shown illustrating process actions that may take place in accordance with the invention shown in FIG. 4. When the process has started, the interaction circuit 110 preferably makes a determination as to whether any RF tag is in proximity to the toy 104 (action 300). If no RF tag is in the vicinity of the toy 104, the process flow loops back to action 300 until an RF tag is detected. At that point, the interaction circuit 110 preferably determines which of the one or more RF tags are in the vicinity of the toy 104. This may be carried out in parallel (as shown in FIG. 5) or serially without departing from the scope of the invention. In particular, the interaction circuit 110 preferably determines whether RF tag 1 is in the vicinity of the toy 104 (action 302) if so, the interaction circuit 110 preferably stores information indicating that the RF tag 1 is present (action 304). If RF tag 1 is not in the vicinity of the toy 104, then the process flow moves to action 306. Similar determinations are made as to whether RF tag 2 is in the vicinity of the toy 104 (e.g., actions 308, 310) and whether other RF tags, such as RF tag N is in the vicinity of the toy 104 (e.g., actions 312, 314).

The interaction circuit 110 is preferably capable of discriminating between the plurality of RF tags 1, 2, . . . N from the plurality of locations A, B, . . . N and/or the plurality of mobile items 106 using any of the known techniques. For example, each RF tag may issue an answer electromagnetic wave at a slightly different frequency in response to the query electromagnetic wave. Thus, the interaction circuit 110 may discriminate between the frequencies of the answer electromagnetic waves in determining whether a particular RF tag is in the vicinity of the toy 104. Alternatively, the answer electromagnetic waves may include a unique code identifying the RF tag from which it is issued and the interaction circuit 110 may discriminate between the RF tags based on the extraction of the unique codes from the received answer electromagnetic waves. In either of these two cases, or using any other known technique, the interaction circuit 110 preferably stores information as to whether one or more of the RF tags are in the vicinity of the toy 104. By way of example, this may achieved by the microprocessor 112 assigning (e.g., tagging, creating, etc.) an index number, e.g., 001, 002, . . . 00N when the sense circuit 134 provides an indication that a particular answer electromagnetic wave has been received. The index number may then be stored in memory 114 for later reference.

The interaction circuit 110 is preferably operable to select an output perceptible by the one or more users 102 in response to answer electromagnetic wave(s) received from one or more of the plurality of RF tags 1, 2, . . . N (such as from locations A, B, . . . N and/or mobile items 106). It is most preferred that the interaction circuit 110 select an output, such as a phrase, that includes characteristics that correspond to one or more of the locations, A, B, . . . and/or N, from which the answer electromagnetic wave(s) are received. For example, the locations A, B, . . . N may represent rooms in the home of the user 102, such as a kitchen, a living room, a dining room, a family room, a bedroom, a bathroom, a basement, a garage, a foyer, an attic, a hallway, etc. When RF tag 1 is dispose at location A, for example, a kitchen, the answer electromagnetic wave issued by the RF tag 1 preferably includes information identifying location A as such, e.g., by way of unique code or frequency of oscillation. When RF tag 2 is disposed at location B, a bedroom, the answer electromagnetic wave issued by the RF tag 2 preferably includes information identifying location B as such, etc. The interaction circuit 110 preferably selects an appropriate output from among the plurality of stored outputs based on which RF tags are present. In particular, the microprocessor 112 may retrieve the stored index number(s) from the memory 114 indicating which of RF tags were found to be in the vicinity of the toy 104. An appropriate output may then be selected by the microprocessor 112 based on the index numbers.

By way of example, index number 001 may be associated with location A, e.g., the kitchen; index number 002 may be associated with location B, e.g., the bedroom, etc. When the microprocessor 112 determines that an RF tag of a mobile item 106 is in the vicinity of the toy 104 and that RF tag 1 of location A (e.g., the kitchen) has been sensed (e.g., actions 302, 304), then the microprocessor 112 may select the phrase "Its time for breakfast" (action 306). Alternatively, when the microprocessor 112 determines that RF tag 2 of location B (e.g., the bedroom) has been sensed (e.g., actions 308, 310), then the microprocessor 112 may preferably select the phrase "Its time for bed." Still further, when the RF tag of the mobile item 106 has been associated with a particular user defined phrase (such as the user's name), the microprocessor 112 may be operable to select the phrase "John, its time for bed."

When the selection of the appropriate output is complete (action 306), then the process loops back to action 300.

It will be apparent to the skilled artisan having read the disclosure herein that many differing combinations of RF tags, mobile items 106, users 102, toys 104, and outputs may be employed without departing from the spirit and scope of the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus, comprising:
   a) a first item and a second item physically separate from the first item, the first and second items selected from one or more mobile items operable to be carried by a user and one or more items operable to be placed at one or more respective locations, the first item including a radio frequency tag operable to produce a first answer electromagnetic wave in response to a query electromagnetic wave and the second item including a radio frequency tag operable to produce a second answer electromagnetic wave in response to the query electromagnetic wave; and
   b) a toy including a query circuit and an interaction circuit, the query circuit being operable to emit the query electromagnetic wave and receive the first answer electromagnetic wave from the first item and the second answer electromagnetic wave from the second item the interaction circuit being operable to i) associate a user-defined output including one or more first words with one or more of the first and second answer electromagnetic waves; ii) select the user-defined output based on receiving the associated one or more answer electromagnetic waves; iii) simultaneously select a second output including one or more second words from among a plurality of outputs based on receiving a particular one or more of the first and second answer electromagnetic waves; and iv) output, in user-perceptible manner, the selected user-defined output combined with the simultaneously selected second output to form an intelligible phrase.

2. The apparatus of claim 1, wherein the interaction circuit includes an output circuit coupled to at least one output transducer operable to output the user-defined output combined with the second output.

3. The apparatus of claim 2, wherein the at least one output transducer includes at least one of an audio transducer, a visual transducer, a tactile transducer, and a mechanical transducer.

4. The apparatus of claim 3, wherein the output circuit includes said audio transducer and the audio transducer is operable to audibly output the user-defined output and the second output.

5. The apparatus of claim 4, comprising the first and second items, wherein the interaction circuit is operable to select at least one of the user-defined output and the second output based on which of the one or more of the first and second answer electromagnetic waves is received.

6. The apparatus of claim 4, wherein the interaction circuit is operable to receive the one or more first words of the user-defined output from the user and to store the one or more first words, wherein the interaction circuit is operable to select the stored one or more first words for output.

7. The apparatus of claim 6, wherein the interaction circuit is operable to associate the user-defined output with the one or more electromagnetic waves by the user selecting one or more of the mobile items.

8. An apparatus, comprising:
   a plurality of radio frequency tags including a first radio frequency tag operable to produce a first answer electromagnetic wave in response to a query electromagnetic wave and a second radio frequency tag housed physically separate from the first item operable to produce a second answer electromagnetic wave in response to the query electromagnetic wave; and
   a toy including a query circuit and an interaction circuit, the query circuit being operable to emit the query electromagnetic wave and receive the first and second answer electromagnetic waves, and the interaction circuit being operable to i) associate a user-defined output including one or more first words with one or more of the first and second answer electromagnetic waves; ii) select the user-defined output based on receiving the associated one or more of the first and second answer electromagnetic waves; iii) simultaneously select a second output including one or more second words from among a plurality of outputs based on receiving a particular one or more of the first and second answer electromagnetic waves; and iv) to output, in user-perceptible manner, the selected user-defined output combined with the simultaneously selected second output to form an intelligible phrase.

9. The apparatus of claim 8, wherein the first and second radio frequency tags are disposed at respective physical locations, and the interaction circuit is operable to select at least one of the user-defined output and the second output from among a plurality of outputs based on which one or more of the first and second answer electromagnetic waves is received.

10. The apparatus of claim 8, wherein each of the first and second answer electromagnetic waves includes at least one of: (i) frequency content that is different from another one of the first and second answer electromagnetic waves, and the interaction circuit is operable to distinguish which one or more of the first and second answer electromagnetic waves are received based on the frequency content thereof; and (ii) a code that is different from others of the first and second answer electromagnetic waves, and the interaction circuit is operable to distinguish which one of the first and second answer electromagnetic waves are received based on the codes thereof.

11. The apparatus of claim 10, wherein the interaction circuit is operable to store indications of which one or more of the first and second answer electromagnetic waves are received.

12. The apparatus of claim 11, wherein the indications are at least one of assigned, tagged, and created index numbers.

13. The apparatus of claim 12, wherein the interaction circuit is operable to select at least one of the user-defined output and the second output based on which of the index numbers were stored.

14. The apparatus of claim 9, wherein the plurality of outputs include characteristics that correspond to respective characteristics of the physical locations.

15. The apparatus of claim 14, wherein the respective characteristics of the physical locations include a type of room in which a given one of the radio frequency tags is disposed.

16. The apparatus of claim 15, wherein the type of room is taken from the group consisting of: a kitchen, a living room, a dining room, a family room, a bedroom, a bathroom, a basement, a garage, a foyer, an attic, and a hallway.

17. The apparatus of claim 15, wherein the interaction circuit includes an output circuit coupled to at least one output transducer operable to output the user-defined output combined with the second output.

18. The apparatus of claim 17, wherein the at least one output transducer includes at least one of an audio transducer, a visual transducer, a tactile transducer, and a mechanical transducer.

19. The apparatus of claim 18, wherein said output circuit includes said audio transducer and is operable to audibly output the user-defined output combined with the second output.

20. The apparatus of claim 19, wherein at least one of the selected user-defined output and the selected second output includes the characteristics that correspond to the respective characteristics of the physical locations at which one or more of the radio frequency tags are disposed and from which one or more of the first and second answer electromagnetic waves are received.

21. The apparatus of claim 8, wherein the interaction circuit is operable to receive the one or more first words of the user-defined output from the user, to store the user-defined output, and to select the stored user-defined output.

22. The apparatus of claim 21, wherein the interaction circuit is operable to associate the user-defined output with the the first answer electromagnetic wave by the user selecting one or more of the radio frequency tags.

23. A method, comprising:
providing at least a first item and a second item selected from at least one mobile item operable to be carried by a user and at least one other item operable to be associated with a location, the first item operable to emit a first answer electromagnetic wave in response to receiving a query electromagnetic wave and the second item operable to emit a second answer electromagnetic wave in response to receiving a query electromagnetic wave;
providing a toy operable to emit the query electromagnetic wave and receive the first and second answer electromagnetic waves;
associating a user-defined output including one or more first words with the first answer electromagnetic wave;
selecting the user-defined output based on receiving the first answer electromagnetic wave;
simultaneously selecting a second output including one or more second words from among a plurality of outputs based on receiving a particular one or more of the first and second answer electromagnetic waves;
outputting, in user perceptible manner from the toy, the selected user-defined output combined with the simultaneously selected second output to form an intelligible phrase.

24. The method of claim 23, wherein the toy includes at least one output transducer operable to output the user-defined output and the second output, and the at least one output transducer includes at least one of an audio transducer, a visual transducer, a tactile transducer, and a mechanical transducer.

25. The method of claim 24, further comprising:
providing at least the first and second items; and
selecting at least one of the user-defined output and the second output based on which one or more of the first and second answer electromagnetic waves are received.

26. The method of claim 25, further comprising receiving the one or more first words of the user-defined output from the user and storing the user-defined output, wherein said selecting selects the stored user-defined output.

27. The method of claim 26, wherein said associating includes specifying one of the first and second answer electromagnetic waves by selecting one of the first and second items by the user.

28. The method of claim 23, further comprising:
providing a plurality of the other items including radio frequency tags operable to produce respective answer electromagnetic waves in response to the query electromagnetic wave, wherein the user-defined output and the second output are selected based on which one or more of the first and second answer electromagnetic waves are received from the at least one mobile item and the plurality of other items.

29. The method of claim 28, wherein the second output is selected from among a plurality of outputs corresponding to respective characteristics of the physical locations, based on which one or more of the first and second answer electromagnetic waves is received.

30. The method of claim 29, wherein at least one of the radio frequency tags is operable to produce one of the first and second answer electromagnetic wave that is distinguishable from another of the first and second answer electromagnetic waves, the method further comprising selecting at least one output from among a plurality of outputs including the user-defined output and the second output by distinguishing which of the one or more of the first and second answer electromagnetic waves is received.

31. The method of claim 30, wherein at least one of the radio frequency tags is operable to produce one of the first and second answer electromagnetic wave including at least one of: (i) frequency content that is different from another of the first and second answer electromagnetic waves; and (ii) a code that is different from another of the first and second answer electromagnetic waves, the method further comprising distinguishing which of the one or more of the first and second answer electromagnetic waves is received based on at least one of the frequency content and the codes thereof.

32. The method of claim 31, further comprising storing indications of which of the one or more of the first and second answer electromagnetic waves is received.

33. The method of claim 32, wherein the indications are at least one of assigned, tagged, and created index numbers.

34. The method of claim 33, further comprising selecting at least one of the user-defined output and the second output based on which of the index numbers are stored as indications of receiving the one or more of the first and second answer electromagnetic waves.

35. The method of claim 29, wherein the respective characteristics of the physical locations include a type of room in which a given one of the radio frequency tags is disposed.

36. The method of claim 35, wherein the type of room is taken from the group consisting of: a kitchen, a living room, a dining room, a family room, a bedroom, a bathroom, a basement, a garage, a foyer, an attic, and a hallway.

37. The method of claim 29, wherein the second output corresponds to the respective characteristics of the physical locations at which one or more of the radio frequency tags are disposed and from which one or more of the answer electromagnetic waves is received.

38. The apparatus of claim 1 wherein the interaction circuit is operable to select the second output based on receiving the particular one or more of the first and second answer electromagnetic waves that is associated with the user-defined output.

39. The apparatus of claim 1 wherein the second output is selected, based on receipt of a particular answer electromagnetic wave which is different from the answer electromagnetic wave associated with the user-defined output.

40. A method, comprising:
utilizing a toy to detect the presence or lack of presence of a first wireless electromagnetic signal from a first item of a plurality of physically separate items and to detect the presence or lack of presence of a second wireless electromagnetic signal from a second item of the plurality of physically separate items;
associating a user-defined output including one or more first words with said first wireless electromagnetic signal;
selecting said user-defined output based on receiving said first wireless electromagnetic signal;
selecting a second output including one or more second predefined words based on receiving said second wireless electromagnetic signal; and
outputting, in user-perceptible manner, said user-defined output combined together with said second output to form an intelligible phrase.

41. A method, comprising:
utilizing a toy to detect the presence or lack of presence of at least a first wireless electromagnetic signal from a first one of a plurality of physically separate items and a second wireless electromagnetic signal from a second one of a plurality of physically separate items; and
outputting, in user-perceptible manner, upon detecting said first and second wireless electromagnetic signals, a first set of predefined words associated with said first wireless electromagnetic signal and a second set of predefined words associated with said second wireless electromagnetic signal, said first and second sets of predefined words being combined together to form an intelligible phrase.

42. The method as claimed in claim 41, wherein said first set of predefined words includes one or more words, said one or more words being defined by a user of the toy.

43. The method as claimed in claim 41, further comprising outputting, in user-perceptible manner, upon detecting only said first wireless electromagnetic signal, said first set of predefined words but not outputting said second set of predefined words.

44. The method as claimed in claim 43, further comprising outputting, in user-perceptible manner, upon detecting only said second wireless electromagnetic signal, said second set of predefined words but not outputting said first set of predefined words.

* * * * *